United States Patent
Diemer et al.

(10) Patent No.: US 6,875,352 B1
(45) Date of Patent: Apr. 5, 2005

(54) MODULE FILTER COMPRISING AT LEAST ONE ADMISSION FOR THE NON-FILTRATE AND AT LEAST ONE DISCHARGE FOR THE FILTRATE AND COMPRISING AT LEAST ONE FILTER MODULE

(75) Inventors: Wolfgang Diemer, Waldstetten (DE); Horst Freischlag, Böbingen (DE); Klaus Figgle, Altbach (DE); Eberhard Scheible, Schwäbisch Gmünd (DE)

(73) Assignee: Pall Corporation, East Hills, NY (US)

( * ) Notice: Subject to any disclaimer, the term of this patent is extended or adjusted under 35 U.S.C. 154(b) by 0 days.

(21) Appl. No.: 09/868,425

(22) PCT Filed: Dec. 8, 1999

(86) PCT No.: PCT/EP99/09634

§ 371 (c)(1),
(2), (4) Date: Jun. 15, 2001

(87) PCT Pub. No.: WO00/35555

PCT Pub. Date: Jun. 22, 2000

(30) Foreign Application Priority Data

Dec. 15, 1998 (DE) .............................. 198 57 751

(51) Int. Cl.$^7$ ........................................... B01D 25/26
(52) U.S. Cl. ................. 210/224; 210/227; 210/231; 210/486; 210/347
(58) Field of Search .............................. 210/224, 227, 210/228, 230–232, 330–331, 346, 486, 323.1, 210/321.75, 321.84, 337, 338, 347

(56) References Cited

U.S. PATENT DOCUMENTS

| 2,475,833 A | * | 7/1949 | Gunn | .......................... 210/133 |
| 2,548,584 A | * | 4/1951 | Briggs | ......................... 210/457 |
| 2,604,994 A | * | 7/1952 | Vocelka | ....................... 210/492 |
| 2,654,440 A | * | 10/1953 | Robinson | .................... 210/347 |
| 2,692,686 A | * | 10/1954 | Fleck et al. | ................... 210/97 |
| 2,755,937 A | * | 7/1956 | Gunn | ......................... 210/492 |

(Continued)

FOREIGN PATENT DOCUMENTS

DE          8620132        * 9/1986

(Continued)

Primary Examiner—Terry K. Cecil
(74) Attorney, Agent, or Firm—Leydig, Voit & Mayer, Ltd.

(57) ABSTRACT

A module filter has a container with an admission for a non-filtrate and a discharge for the filtrate. A filter module is arranged in the container and has several stacked, disc-shaped filter cells of filter material having an inner space. The filter cells have central openings forming a central channel connected with the inner space. The central channel is connected to the admission. The container has a space surrounding the filter cells and connected with the filtrate discharge. Circular disc-shaped drainage support bodies are arranged between the filter cells and extend approximately over the entire surface area of the filter cells. The drainage support bodies have drainage channels that extend toward their outer rim. The drainage support bodies have projections projecting axially away from the drainage support bodies and extending radially. Between the projections intermediate spaces are defined which form the drainage channels and remove the filtrate.

23 Claims, 6 Drawing Sheets

U.S. PATENT DOCUMENTS

| | | | | |
|---|---|---|---|---|
| 3,294,241 A | * | 12/1966 | Sicard et al. | 210/232 |
| 4,347,208 A | * | 8/1982 | Southall | 264/229 |
| 4,392,956 A | * | 7/1983 | Vogel | 210/224 |
| 4,704,207 A | * | 11/1987 | Chu | 210/347 |
| 4,737,285 A | * | 4/1988 | Krulitsch et al. | 210/230 |
| 4,855,062 A | * | 8/1989 | Oelbermann | 210/739 |
| 5,271,838 A | * | 12/1993 | Rahimi et al. | 210/346 |
| 5,549,824 A | * | 8/1996 | Trumpf et al. | 210/323.1 |
| 5,779,899 A | * | 7/1998 | Shiomi et al. | 210/346 |
| 6,306,298 B1 | * | 10/2001 | Diemer | 210/232 |

FOREIGN PATENT DOCUMENTS

| | | | |
|---|---|---|---|
| DE | 19744572 | * | 4/1999 |
| EP | 285031 A2 | * | 10/1988 |
| EP | 671198 | * | 9/1995 |
| WO | WO 99/19041 | * | 4/1999 |
| WO | WO 99/19042 | * | 4/1999 |

* cited by examiner

MODULE FILTER COMPRISING AT LEAST ONE ADMISSION FOR THE NON-FILTRATE AND AT LEAST ONE DISCHARGE FOR THE FILTRATE AND COMPRISING AT LEAST ONE FILTER MODULE

BACKGROUND OF THE INVENTION

The invention relates to a module filter with at least one admission for the non-filtrate and a discharge for the filtrate and with at least one filter module. From EP 0 233 999 A a filter module is known in which the filter cells and support bodies are stacked alternatingly along a central pipe. Support structures are also provided in the filter cells which support the filter material of the filter cells. The non-filtrate is guided from the exterior into the filter cells, and the filtrate is discharged via the interior of the filter cells and via the central pipe. A disadvantage in this connection is that, on the one hand, the support bodies prevent a uniform entry of the non-filtrate into the filter cells and, on the other hand, the filtered materials deposit on the support bodies between the filter cells and on the entire interior chamber of the module filter.

SUMMARY OF THE INVENTION

The present invention has the object to provide a module filter of the aforementioned kind which, with minimized apparatus expenditure, enables a complete separation of the filtrate from the non-filtrate, wherein the separated solids can be disposed of completely and residue-free without necessitating cleaning of the module filter.

This object is solved by a module filter wherein that the central channel is connected to an admission for the non-filtrate and connected with the inner space of the filter cells and in that a space surrounding the filter cells is formed within the container housing which is connected with the discharge for the filtrate, and in that the support bodies are formed as drainage support bodies which extend at least approximately over the entire surface area of the filter cells, wherein in the drainage support body a plurality of drainage channels are provided which extend toward the outer rim of the filter cells or the drainage support bodies.

The important advantages of the subject matter of the invention are to be seen in that the inflow of the non-filtrate into the filter module is realized via a central channel so that the solids can be deposited in the individual filter cells and cannot exit to the exterior during disposal. Moreover, the danger of washing out filtered material from the filter layers is prevented as a result of the configuration of the module with inwardly arranged inflow. Between the filter cells of the filter module, a drainage support body, respectively, supports the differential pressure and takes over removal of the filtrate to a discharge of the module filter. The drainage support body arranged external to the filter cell also takes over the protective function for the filter layer. Conventionally used protective nonwoven cloth can thus be omitted. It is not necessarily required to provide in the filter cell itself a drainage support body so that the complete interior chamber of the filter cell can be filled with solids. On the one hand, cake washing in the filtration device is thus possible and, on the other hand, the separated solids can be disposed of completely and residue-free by exchanging the filter modules without requiring cleaning of the filter housing surfaces. The operating personnel is thus not endangered during disposal of the solids because the solids together with the filter modules can be removed from the module filter and disposed of.

Also, as a result of the reversed fluid flow, i.e., from the interior of the filter cells to the interior of the container, in comparison to the module filter of the aforementioned kind, the components are only wetted with filtrate. Accordingly, the liquid, which sometimes represents a valuable substance, can be completely recovered at the same time. The cleaning expenditure is eliminated.

In the back washing configuration of the module, a drainage support body which is arranged in the filter cell ensures that a back washing of the filtrate is possible at full operating pressure without the filter cell collapsing. In this connection, a back washing of the filtrate enables a better use of the filter material. Also, a chemical washing of the cake in both directions is possible.

The complete filter apparatus is of a very simple configuration and requires minimal investment costs even in connection with high corrosion requirements. The filter modules are connected according to the principle of the prior patent application DE197 44 574.8, i.e., by adaptors, which engage the connecting rings of the filter modules. In another embodiment, a central rod takes over several tasks. It serves, on the one hand, for fixing the filter modules stacked in the filter container in that it is guided through their central openings. Moreover, it serves as a tie rod for a lid with press plate at the upper end of the filter module layer in that it is supported by means of a fastening arrangement, in particular, a bayonet closure, on the bottom plate of the module filter. With cooperation of the sealing rings positioned between the filter modules, the filter modules are sealed relative to one another. In another embodiment, a sealing element for sealing relative to the container bottom and the container cover is eliminated because the filter material at these connecting locations is already shaped to have a sealing profile which matches correspondingly profiled surfaces on the container bottom and the container cover. However, the central rod serves particularly as an admission for the non-filtrate which can reach the filter cells via openings in its mantle surface. Usually, a container is placed about the stacked filter modules which, in turn, can be of a light construction because, viewed in the direction of the fluid flow, it is positioned at the almost pressure-free discharge side. The container has only a guiding and shielding function relative to the filtrate flow. When using a central rod, the filter modules are stripped of the central rod and disposed of for removal of the solids. Otherwise, the filter modules are individually decoupled and disposed of.

BRIEF DESCRIPTION OF THE DRAWINGS

Embodiments of the invention will be explained in the following in more detail with the aid of the drawing. In the drawing it is shown in.

DESCRIPTION OF PREFERRED EMBODIMENTS

Figure 1:
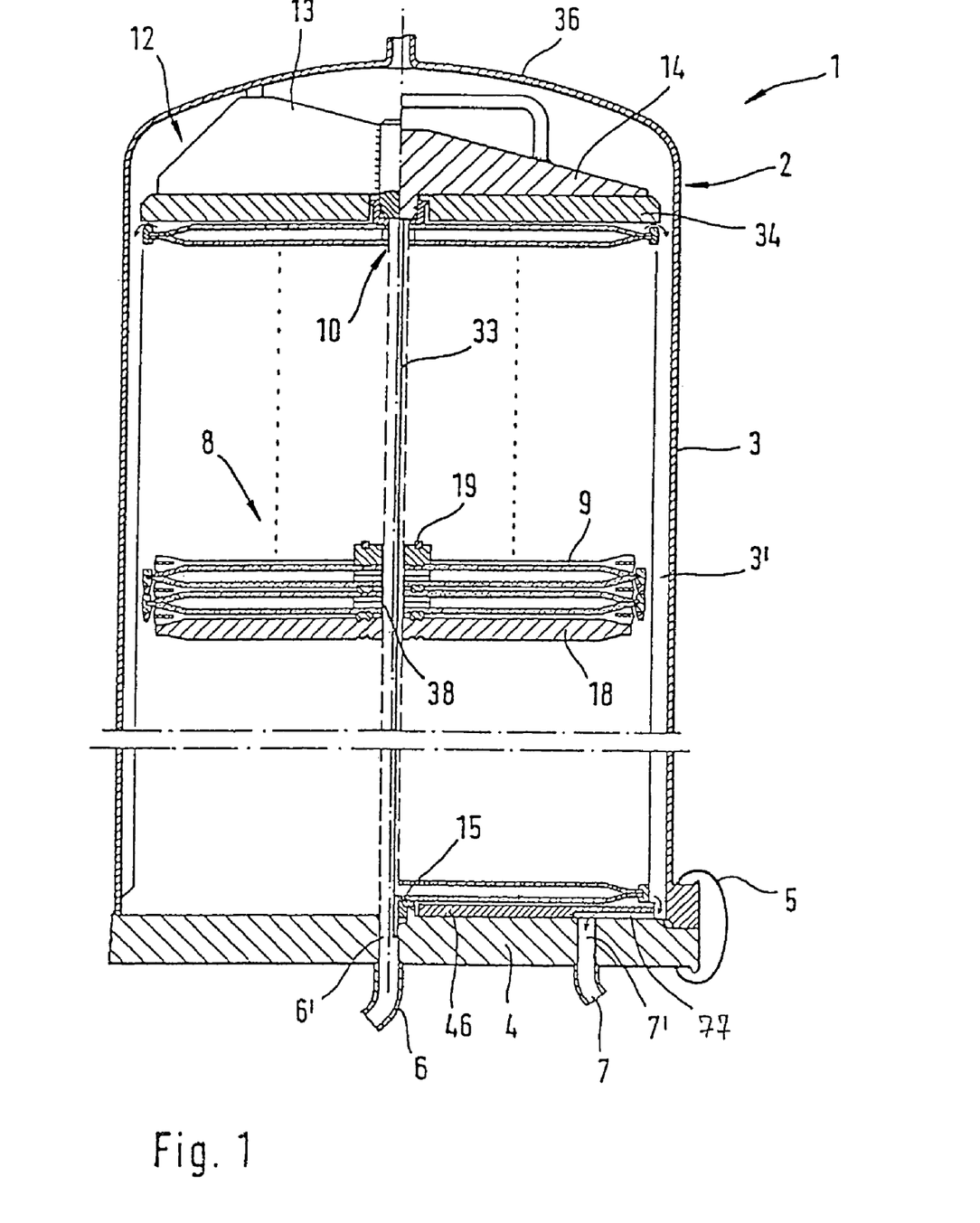
FIG. 1 the schematic illustration of an axial section of a module filter.

In FIG. 1, a module filter 1 for the filtration of liquids, such as chemical suspensions or wine, beer and juice, is illustrated. It is comprised of the container 2 with housing 3 and bottom 4. The housing 3 is secured by means of mushroom head anchor screws 5 in a pressure-tight way on the bottom 4. In the container a central rod 33 is secured on the bottom 4 by means of a fastening arrangement 15 which is formed, in particular, as a bayonet closure. The filter modules 8 are arranged with their central openings 10 axially aligned on top of one another and form a central channel 28 at their center. The filter modules 8 are sealed relative to one another by sealing rings 19 and by a drainage cover plate 34 which is supported either by means of a support cap 12 with support ribs 13 against a container cover 36 or by a press plate with tie rod 14 against the bottom 4 so that the filter modules 8 are secured between a drainage bottom plate 46 and a drainage cover plate 34. The drainage cover plate according to a further embodiment of the module filter can be pressed by a pressing device, which is supported on the container cover external to the container. Between the individual filter modules 8 drainage intermediate plates 18 are positioned which guide the filtrate away between the filter modules 8 and support the differential pressure between the filter modules 8. Each filter module 8 is comprised of several stacked filter cells 9.

A connecting pipe 6 on the container bottom 4 serves as an admission 6' for the non-filtrate which reaches the interior of the filter cells 9 via the central channel 28 and openings 39 arranged in its mantle surface 38. The solids are deposited here and the filtrate enters the hollow space delimited by the housing 3 through the intermediate spaces of the neighboring filter cells 9. The filtrate flows to the container bottom 4 and exits from the hollow space 3' surrounding the filter modules 8 through the discharge 7' into a connecting pipe 7 for discharging the filtrate. In the area of the discharge 7', the drainage bottom plate 46 has a recess 77 so that there is always a sufficient cross-sectional space available for the filtrate.

Figure 2:
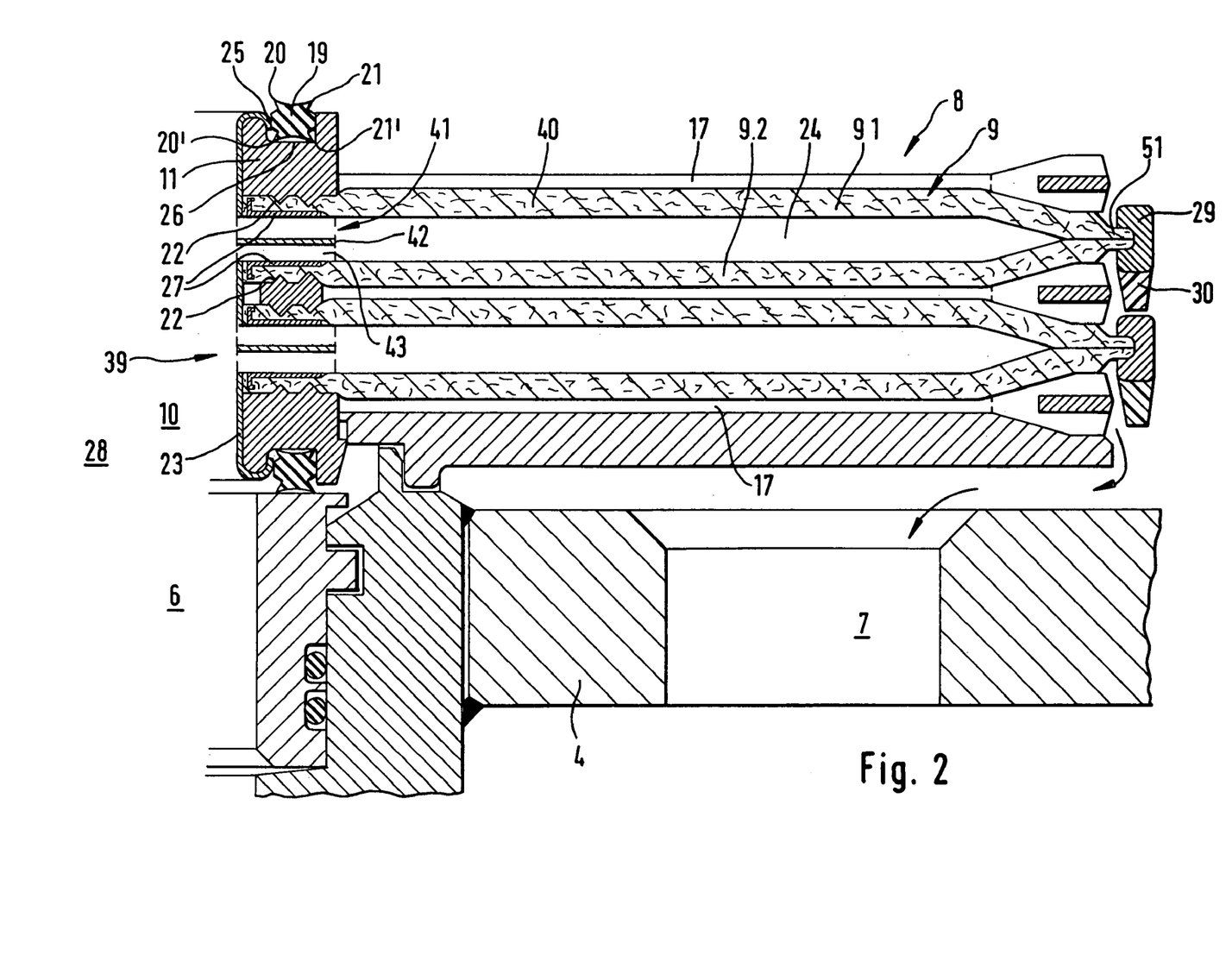
FIG. 2 a cross-section of a filter module according to the invention.

FIG. 2 shows a cross-section of one half of the filter module 8 which is comprised of several disc-shaped filter cells 9 which are stacked on one another with interposition of a drainage support body 17, respectively. The filter cells 9 have a central opening 10 and are aligned such that they are congruently positioned above one another. The filter cells 9 are comprised substantially of two layers 9.1 and 9.2 of a filter material, in particular, a filter layer and/or a filter membrane wherein the radially outer edges of the upper and lower layers are connected sealingly by a peripheral frame 29. Between the layers 9.1 and 9.2 of the filter cells 9 a hollow space 24 is formed. At the underside of the frame 29, support knobs 30 are uniformly distributed about the periphery wherein each filter cell 9 is supported by means of the support knobs 30 on the frame 29 of the neighboring filter cell 9 so that a predetermined spacing between two neighboring filter cells 9 is maintained.

In order to keep the respective hollow space 24 of the filter cells 9 in open communication with the central channel 28, ring-shaped support elements 41 are inserted whose inner radius is matched to the cross-sectional shape of the central channel 28. As can be seen in the plan view of FIG. 5 and an enlarged illustration of a view in the radial direction according to FIG. 7, the support elements 41 are formed of a central disc 42 with axially projecting and radially oriented ribs 43. The filter cells 9 are provided at the radially inwardly positioned area with cover rings 27 of a pressure-proof material on which the ribs 43 of the support elements 41 are supported.

Between the filter cells 9 drainage support bodies 17 are inserted which have a contour substantially identical with that of the filter cells 9. The drainage support bodies 17 are secured by projections 22 in that these penetrate into the substantially softer material of the upper and lower layers 9.1 and 9.2 of the neighboring filter cells 9. At the axial ends of the filter modules 8, a closure ring 11 is provided, respectively, which rests against the outer side of the filter cells 9 positioned at the end and which has an annular groove 26 in the end face facing away from the filter module 8. A sleeve 23 extends through the central openings of all filter cells 9 wherein the sleeve is provided with a plurality of openings 39 in its mantle surface so that the hollow spaces 24 of the filter cells 9 are connected with the central channel 28 extending within the sleeve 23.

The sleeve 23 has at its axial ends a bent edge 25 with a portion extending in the axial direction to the filter module 9 and engaging the annular groove 26 to thus secure the filter module 8 comprised of the filter cells 9, the drainage support bodies 17, and the support elements 41 in its position. Moreover, in the annular groove 26 a sealing ring 19 is provided which has in a preferred embodiment sealing lips 20, 20'; 21, 21' facing toward and away from the filter module 8, respectively, in order to ensure a safe sealing action of the filter modules 8 relative to one another and in the case of thermal expansion of the filter modules.

Figures 3, 4:
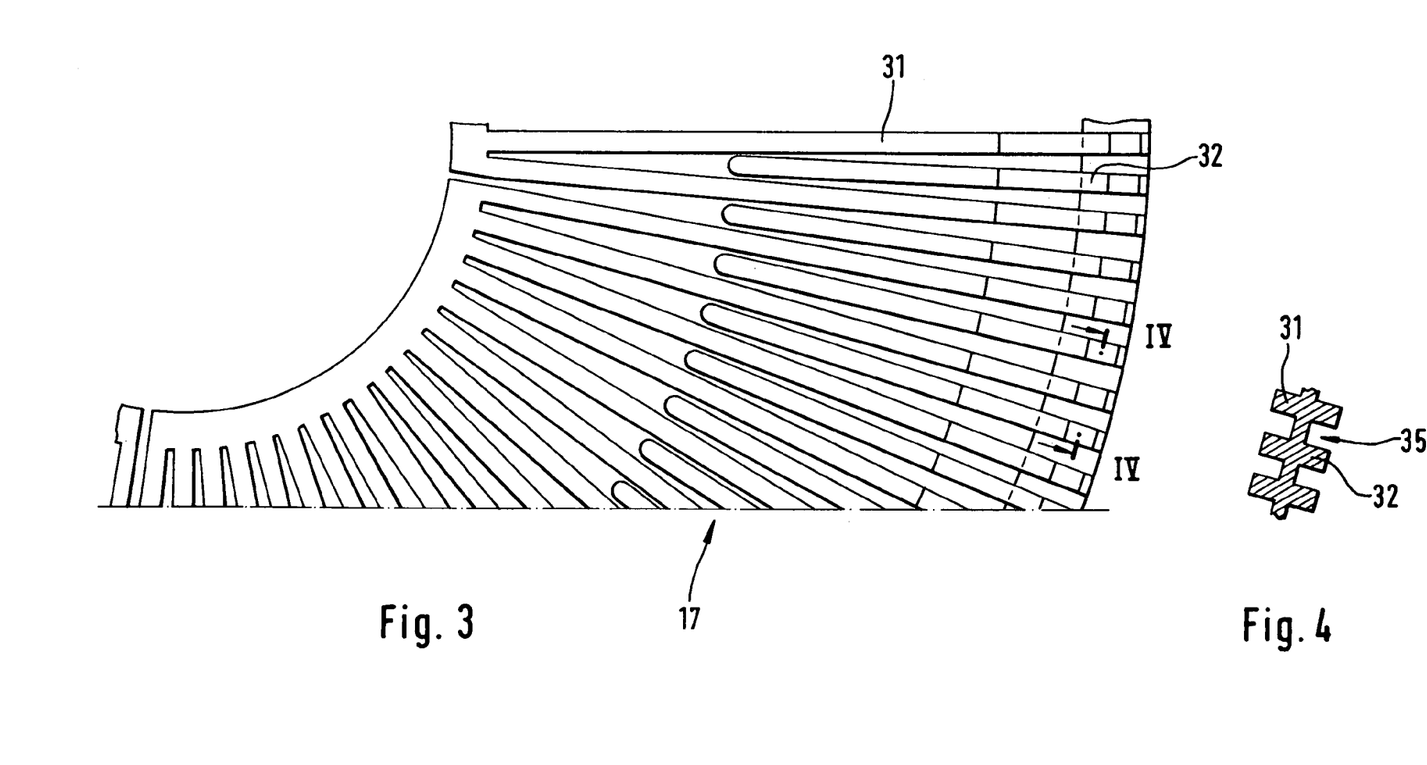
FIG. 3 a detail of a plan view onto a drainage support body.
FIG. 4 a section along the line IV—IV of FIG. 3.

FIG. 3 shows a detail of a plan view onto a drainage support body 17. Preferably, its contour is circular disc-shaped with radially extending projections 31, 32. The projections 31, 32 have different lengths with regard to their radial extension so that the spacing between the projections cannot surpass a critical size and the layers 9.1 and 9.2 are safely supported on the projections 31, 32, despite the differential pressure between the hollow space 24 and the outer side of the filter cells 9, without the material of the layers, in particular, the nonwoven filter cloth, dropping into the drainage grooves 35 formed between the projections 31, 32. Preferably, the drainage support bodies 17 have a descending slope away from the central opening 10 to their rim. This ensures that the filtrate can flow radially in the drainage grooves 35 to the exterior toward the container housing 3.

FIG. 4 shows a section of the drainage support body 17 along the line IV—IV in FIG. 3. The strip-shaped, axial projections 31, 32 extending in the radial direction of the drainage support body 17 are spaced apart and form drainage grooves 35 for the filtrate.

Figure 5:
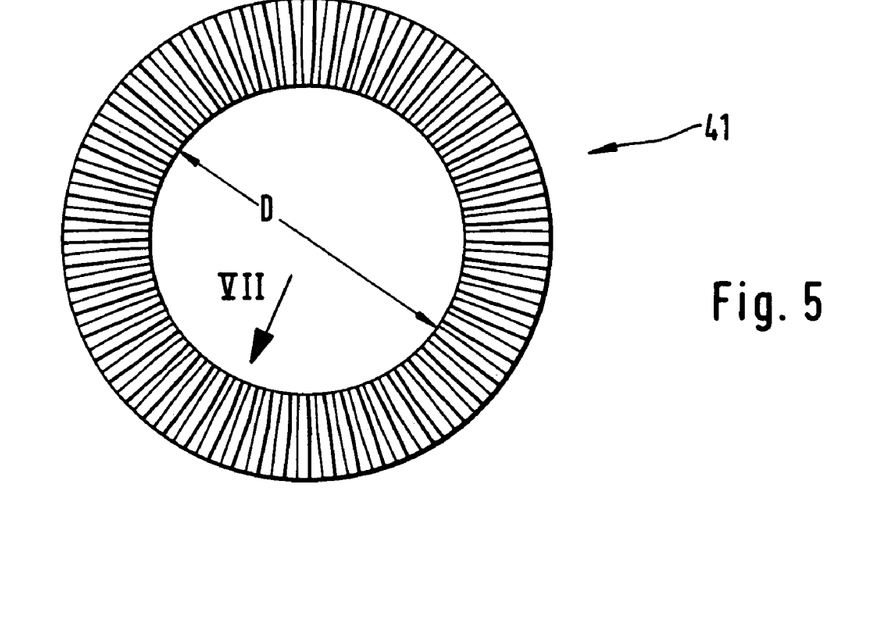
FIG. 5 a plan view onto a support ring.
Figure 6:
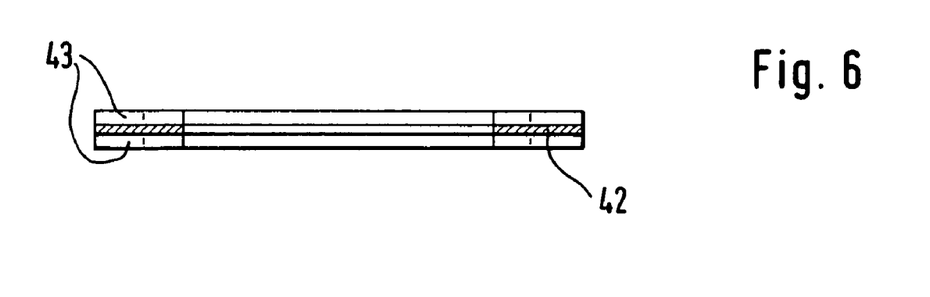
FIG. 6 a cross-section of a support ring.

FIG. 5 shows a plan view onto a support ring 41. Its inner diameter D corresponds to that of the central opening 10. The support ring 41 is provided in this embodiment with spaced apart ribs 43. FIG. 6 shows an axial section of the support ring 41; it is shown that the ribs 43 are arranged on both sides of the base body 42 of the support ring.

Figure 7:
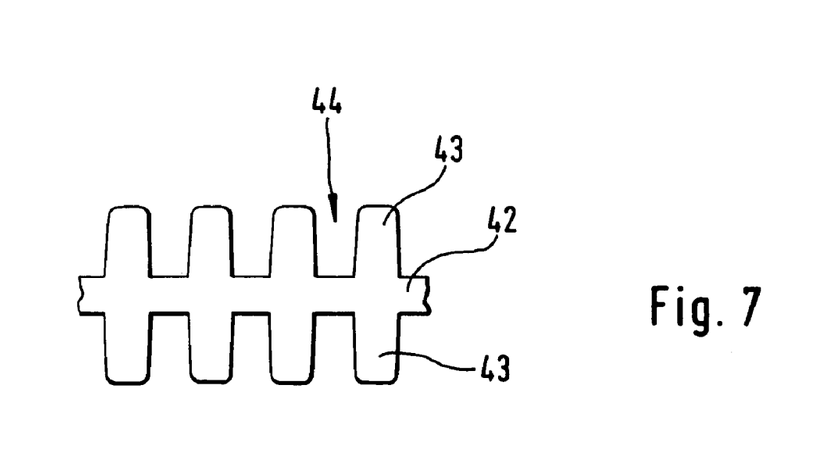
FIG. 7 a view VII onto a support ring.

FIG. 7 shows a view in the direction of arrow VII of the support ring 41. The openings 44 in the support ring 41 through which the non-filtrate reaches the hollow space 24 of the filter cells, are formed by the spaced apart ribs 43.

Figure 8:
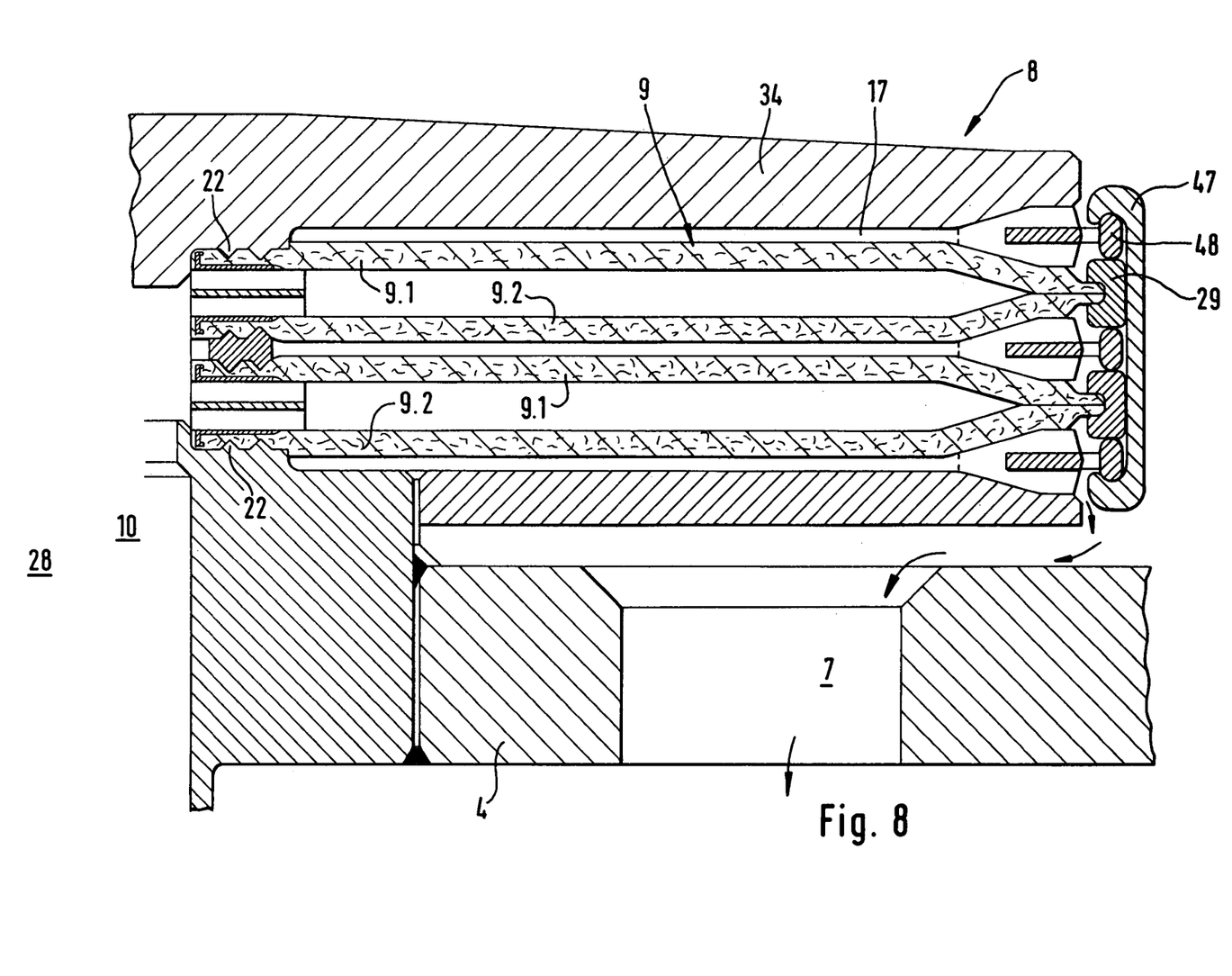
FIG. 8 a cross-section of a filter module secured at the container cover and container bottom in the embodiment without module seal.

FIG. 8 shows a cross-section of one half of a filter module 8 in the embodiment without module seal (reference numeral 19 in FIG. 2) which is secured on the container bottom 4 and the drainage cover plate 34. On the container bottom 4 projections 22 are provided which secure the lower layer 9.2 of the filter layer directly and seal it against the container interior. In the same way, the projections 22 on the drainage cover plate 34 provide a fixation and sealing action of the upper layer 9.1 of the filter layer. A seal at the aforementioned sealing surfaces is therefore not required. Clamps 47 are provided at several locations on the periphery of the filter module 8 and are snapped into place on support knobs 48 which are arranged axially on the drainage support body 17. The clamps 47 connect the upper and lower drainage support bodies 17 of the filter module 8, respectively, and thus secure it on its periphery. For the purpose of disposal of individual filter cells 9, the clamps 47 can be removed.

Figure 9:
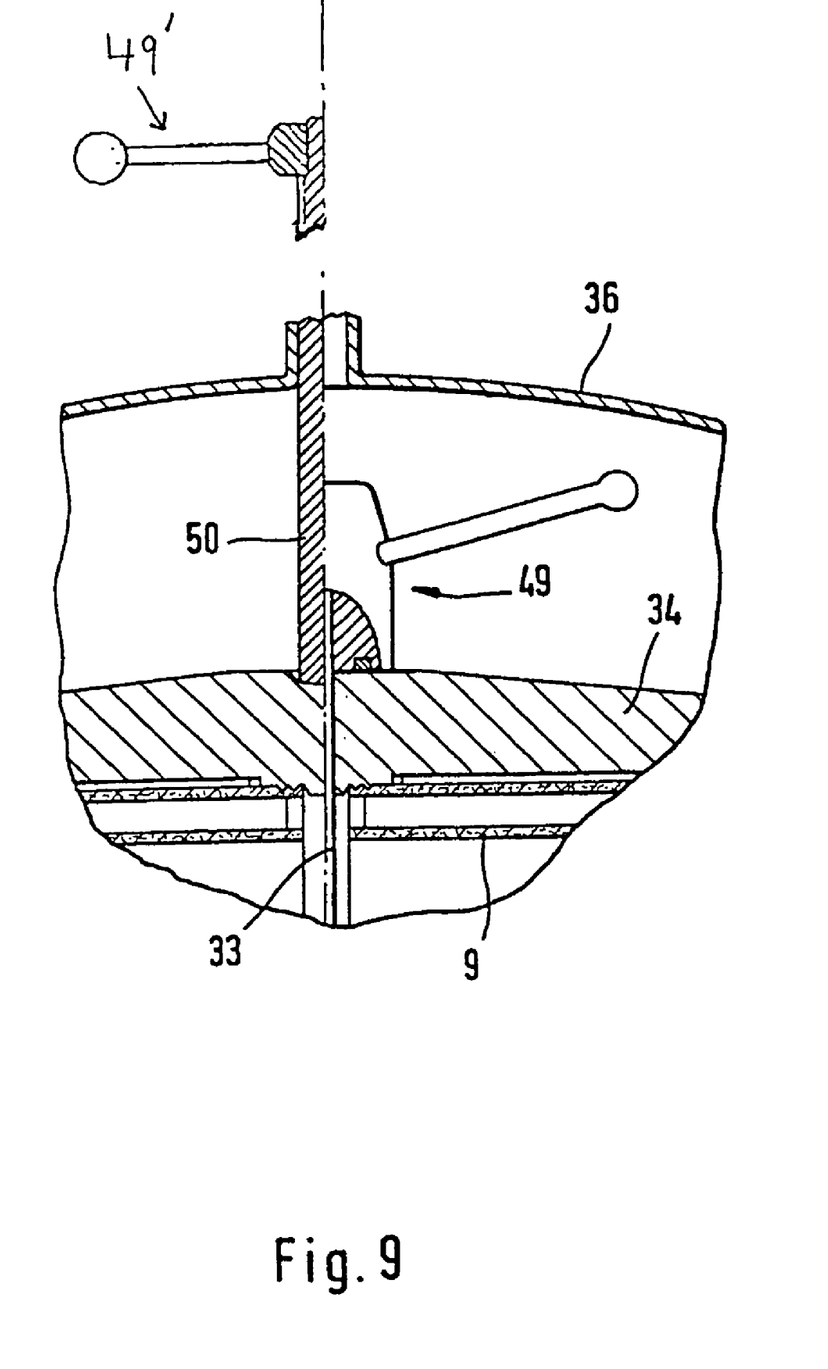
FIG. 9 a detail with two variants of pressing devices for the drainage cover plate.

FIG. 9 shows a detail of two different pressing devices for the drainage cover plate 34. A pressing device 49 provided under the container cover 36 is supported by the tie rod illustrated in FIG. 1 on the container bottom and secures the filter cells 9 of the filter module between the drainage cover plate 34 and the container bottom.

The drainage cover plate 34 can secure the filter cells 9 of the filter modules by means of a pressing device 49', which is supported external to the module filter on the container cover and acts with its press rod 50 on the drainage cover plate 34.

What is claimed is:

1. A module filter comprising:
    a container comprising at least one container housing, a container bottom, at least one admission for a non-filtrate, and a discharge for a filtrate;
    at least one filter module arranged in said container housing comprising several stacked, disc-shaped filter cells, each filter cell substantially comprising first and second filter material layers, each filter material layer having an inner surface and an outer surface, the filter material layers having peripheral edges that are connected sealingly together, the filter cell having a hollow inner space between the filter material layers and further comprising a central opening wherein said central openings of the several filter cells form at least one central channel in fluid communication with said hollow inner space of each of said filter cells;
    a support element in each filter cell, the support element contacting and spacing apart the inner surfaces of each filter material layer, the support element comprising a ring and having an outer diameter, wherein the peripheral edges of the filter material layers are radially spaced from the outer diameter of the support element to provide said hollow inner space, the ring having openings providing fluid communication between said central channel and said hollow inner space of said filter cell;
    said central channel communicating with said admission for the non-filtrate during a filtration mode of said module filter;
    said container housing having a space surrounding said filter cells wherein said space communicates with said discharge for the filtrate;
    circular disc-shaped drainage support bodies arranged between said filter cells, wherein said drainage support bodies extend at least approximately over the entire outer surface of the filter material layers of said filter cells;
    said drainage support bodies having a plurality of drainage channels, respectively, wherein said drainage channels extend radially toward an outer rim of said drainage support bodies;
    said drainage support bodies having projections projecting axially away from both sides of said drainage support bodies, said projections being suitable for contacting an outer surface of an adjacent filter material layer and extending in a radial direction of said drainage support bodies;
    wherein between said projections intermediate spaces are defined; and
    wherein said intermediate spaces form said radial drainage channels and are configured to remove the filtrate.

2. The module filter according to claim 1, wherein said filter cells and said drainage support bodies have a descending slope extending from said central channel radially outwardly.

3. The module filter according to claim 1, wherein said drainage support bodies and said filter cells are formed as circular disks and have at least substantially the same diameter.

4. The module filter according to claim 3, wherein said radial drainage channels extend in the form of radial beams to a peripheral rim of said drainage support bodies.

5. The module filter according to claim 1, wherein said support element has an inner diameter (D) matching approximately the diameter of said central opening.

6. The module filter according to claim 1, wherein said support element comprises a flat annular base body, wherein said base body has spaced apart axial projections extending radially strip-shaped on both sides of said base body.

7. The module filter according to claim 1, wherein each one of said filter cells further comprises a frame, wherein radially outer rims of said first and second filter material layers are connected by said frame to one another.

8. The module filter according to claim 7, wherein said filter material layers are nonwoven filter cloth.

9. The module filter according to claim 7, wherein each one of said frames comprises an underside with support knobs and said frames are supported on one another by said support knobs.

10. The module filter according to claim 1, further comprising a closure ring arranged axially at the ends of said filter module, respectively, and coaxially to said central opening, wherein said filter module comprises several of said filter cells and several of said drainage support bodies alternatingly stacked on one another.

11. The module filter according to claim 10, further comprising a securing element configured to secure said alternatingly stacked filter cells and drainage support bodies and to receive tensile forces, wherein said securing element is arranged at a side of said alternatingly stacked filter cells and drainage support bodies facing said central channel.

12. The module filter according to claim 11, wherein said securing element comprises a metal sleeve and has a mantle surface provided with a plurality of openings, wherein said sleeve has end faces and is connected with said end faces positive-lockingly with said closure rings.

13. The module filter according to claim 12, wherein said closure ring has a recess in the form of an annular ring configured to receive a sealing ring.

14. The module filter according to claim 1, further comprising:
   a central tie rod arranged in said central channel;
   a fastening arrangement, wherein said central tie rod is supported by said fastening arrangement on said container bottom; and
   a drainage cover plate arranged at an upper end of said central tie rod.

15. The module filter according to claim 14, wherein said container has a container cover and wherein said drainage cover plate is supported by a support cap with support ribs on said container cover.

16. The module filter according to claim 14, wherein said drainage cover plate is a press plate provided with an axial tie rod.

17. The module filter according to claim 14, wherein several of said filter modules are aligned with said central openings axially above one another and are secured by said drainage cover plate in said container.

18. The module filter according to claim 17, wherein said container has a container cover and wherein said drainage cover plate is supported by a support cap with support ribs on said container cover.

19. The module filter according to claim 17, wherein said drainage cover plate is a press plate provided with an axial tie rod.

20. The module filter according to claim 17, further comprising a drainage bottom plate arranged between said container bottom and a lowermost one of said filter modules, wherein said drainage bottom plate has a recess in an area neighboring said discharge.

21. The module filter according to claim 17, further comprising a pressing device configured to secure said filter modules between said drainage cover plate and said drainage bottom plate.

22. The module filter according to claim 21, wherein said container has a container cover and wherein said pressing device is supported external to said container on said container cover.

23. The module filter according to claim 21, wherein said pressing device is supported inside said container on said container bottom by said central rod and said fastening arrangement.

* * * * *